United States Patent
Nishinakamura et al.

(10) Patent No.: US 8,731,760 B2
(45) Date of Patent: May 20, 2014

(54) VEHICLE DRIVING SYSTEM CONTROL APPARATUS

(71) Applicant: Denso Corporation, Kariya (JP)

(72) Inventors: Kazutoshi Nishinakamura, Chiryu (JP); Hiroshi Okada, Kariya (JP); Tomohiro Saito, Chiryu (JP); Hiroyuki Usami, Kariya (JP); Hitoshi Noguchi, Nishio (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/726,341

(22) Filed: Dec. 24, 2012

(65) Prior Publication Data
US 2013/0166127 A1      Jun. 27, 2013

(30) Foreign Application Priority Data
Dec. 23, 2011   (JP) .................................. 2011-282518

(51) Int. Cl.
*B60K 6/36*       (2007.10)
(52) U.S. Cl.
CPC ........................................ *B60K 6/36* (2013.01)
USPC ........................................................... 701/22

(58) Field of Classification Search
USPC ................. 701/22; 903/946–947; 180/65.265
See application file for complete search history.

(56) References Cited

FOREIGN PATENT DOCUMENTS

JP     2009-179208     8/2009

OTHER PUBLICATIONS

U.S. Appl. No. 13/719,830, filed Dec. 19, 2012, Tomohiro Saito et al.

*Primary Examiner* — Mary Cheung
*Assistant Examiner* — Anne Mazzara
(74) *Attorney, Agent, or Firm* — Nixon & Vanderhye P.C.

(57) ABSTRACT

A vehicle driving system control apparatus includes a regeneration control section that performs a regeneration control when a vehicle is decelerated. In the regeneration control, the regeneration control section drives at least one of a first motor generator and a second motor generator with a power of an axle so as to charge a battery with an electric power generated with the at least one of the first motor generator and the second motor generator. The regeneration control section selects a mode of the regeneration control by controlling engagement and disengagement statuses of first to third clutches in correspondence with at least one of a target energy regeneration amount, a required brake torque and a vehicle speed.

8 Claims, 4 Drawing Sheets

FIG. 2A BASIC MODE
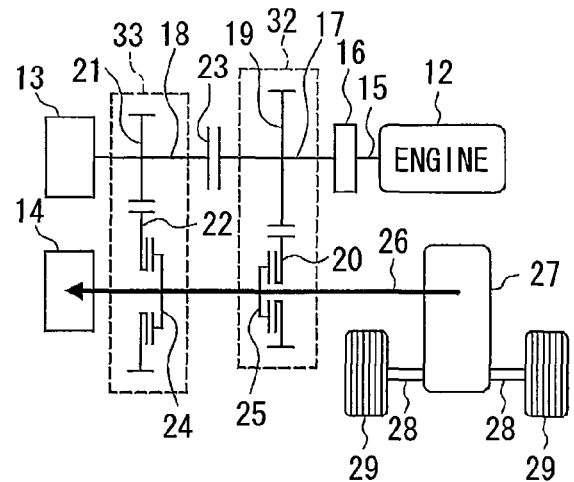
FIG. 2B LOW-SPEED TIME CHARGE ASSIST MODE
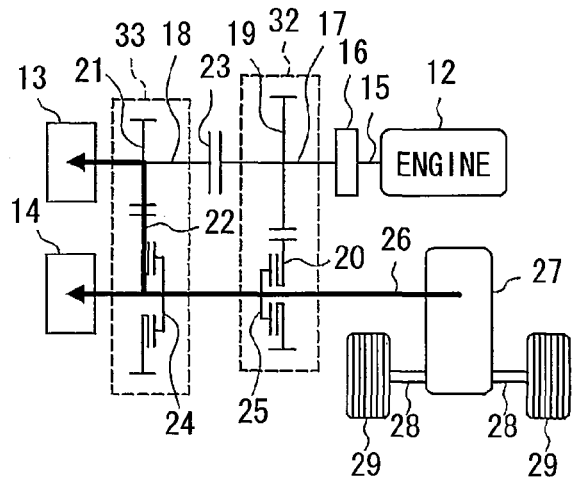
FIG. 2C HIGH-SPEED TIME CHARGE ASSIST MODE
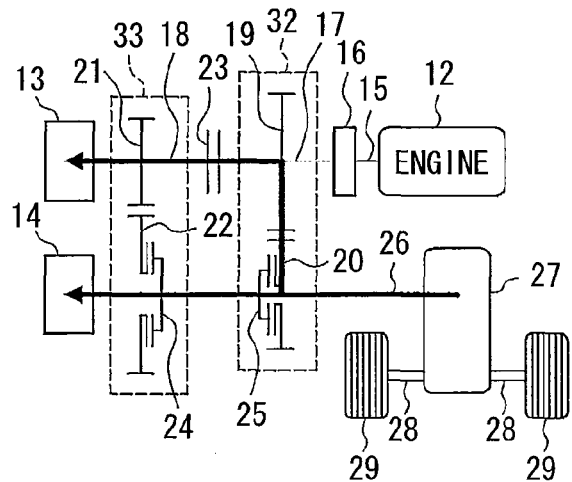

FIG. 4A  HIGH REQUIRED BRAKE TORQUE MODE
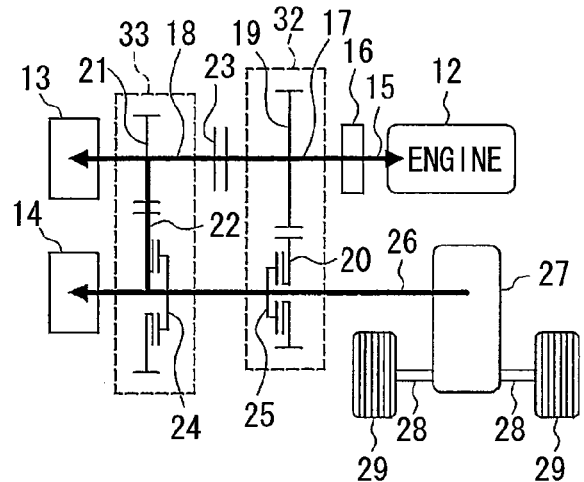
FIG. 4B  INTERMEDIATE REQUIRED BRAKE TORQUE MODE
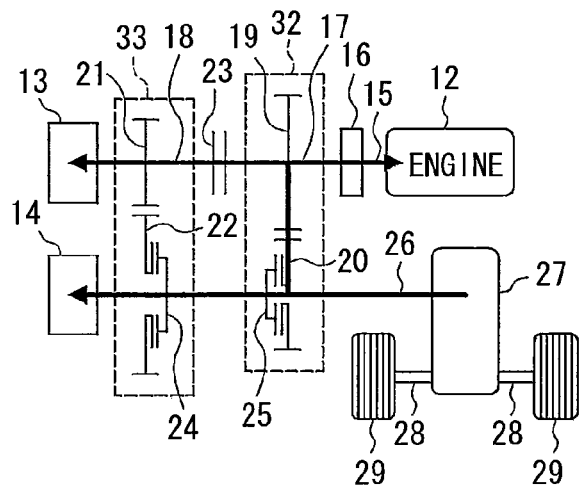
FIG. 4C  LOW REQUIRED BRAKE TORQUE MODE
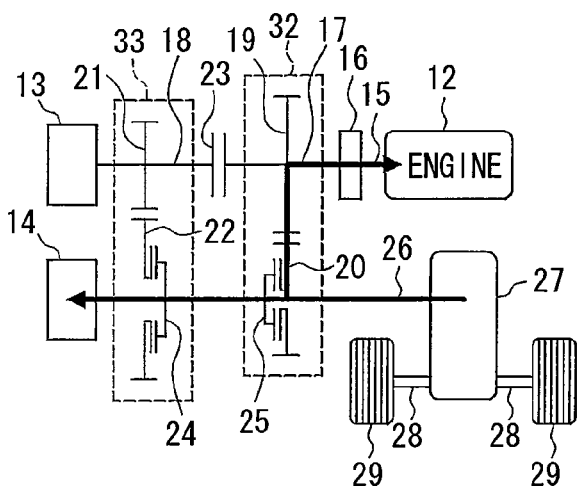

VEHICLE DRIVING SYSTEM CONTROL APPARATUS

CROSS REFERENCE TO RELATED APPLICATIONS

The present application is based on and claims priority to Japanese Patent Application No. 2011-282518 filed on Dec. 23, 2011, the contents of which are incorporated in their entirety herein by reference.

TECHNICAL FIELD

The present disclosure relates to a vehicle driving system control apparatus.

BACKGROUND

In recent years, in view of social requirements for low fuel consumption and low exhaust emission, a hybrid vehicle having an engine and a motor generator (MG) as a vehicle power source attracts attention. In the hybrid vehicle, for example, as disclosed in JP-A-2009-179208, a power output device to transmit engine power and MG power to a driving shaft of the vehicle is provided with a transmission mechanism and clutches. Upon crawl running of traveling in accordance with a set vehicle speed, a gear ratio of the transmission mechanism and clutch engagement status are controlled so as to operate the MG as a power generator (i.e., regeneration control to drive the MG with the power of the axle so as to charge a battery with electric power generated with the MG). Then the regeneration torque of the MG (torque in braking direction) acts on the axle, to reduce load on a friction brake device.

However, in the above-described technique, upon control of the MG to operate as a power generator (i.e., the regeneration control to drive the MG with the power of the axle to charge the battery with the electric power generated with the MG), because the clutch is controlled in a half engagement status, energy loss due to clutch slip occurs, and it is difficult to efficiently perform the regeneration control.

SUMMARY

It is an object of the present disclosure to provide a vehicle driving system control apparatus that can efficiently perform the regeneration control and can reduce a load on a friction brake device.

A vehicle driving system control apparatus includes a power transmission device, a battery, a required brake torque calculation section, a target energy regeneration amount calculation section, and a regeneration control section.

The power transmission device is capable of transmitting a power of an engine and powers of a first motor generator and a second motor generator to an axle of a vehicle. The power transmission device includes an engine input shaft, a motor input shaft, an output shaft, an engine-side gear mechanism, a motor-side gear mechanism, a first clutch, a second clutch, and a third clutch. The engine input shaft transmits the power of the engine. The motor input shaft transmits the power of the first motor generator. The output shaft receives the power of the second motor generator and outputs the power to be transmitted to the axle. The engine-side gear mechanism transmits the power of the engine input shaft to the output shaft without the motor input shaft. The motor-side gear mechanism transmits the power of the motor input shaft to the output shaft without the engine input shaft. The first clutch is engaged and disengaged to enable and disable a power transmission between the engine input shaft and the motor input shaft. The second clutch is engaged and disengaged to enable and disable a power transmission between the motor-side gear mechanism and the output shaft. The third clutch is engaged and disengaged to enable and disable a power transmission between the engine-side gear mechanism and the output shaft.

The battery supplies and receives an electric power to and from the first motor generator and the second motor generator. The required brake torque calculation section calculates a required brake torque based on a vehicle speed and a brake operation amount. The target energy regeneration amount calculation section calculates a target energy regeneration amount based on the required brake torque and a charge status of the battery. The regeneration control section performs a regeneration control when the vehicle is decelerated. In the regeneration control, the regeneration control section drives at least one of the first motor generator and the second motor generator with a power of the axle so as to charge the battery with the electric power generated with the at least one of the first motor generator and the second motor generator. The regeneration control section selects a mode of the regeneration control by controlling engagement and disengagement statuses of the first to third clutches in correspondence with at least one of the target energy regeneration amount, the required brake torque and the vehicle speed.

BRIEF DESCRIPTION OF THE DRAWINGS

Additional objects and advantages of the present disclosure will be more readily apparent from the following detailed description when taken together with the accompanying drawings. In the drawings:

FIGS. 2A to 2C are block diagrams explaining a mode selection in a regeneration control in the first embodiment;

FIGS. 4A to 4C are block diagrams explaining a mode selection in a regeneration control in a second embodiment of the present disclosure.

DETAILED DESCRIPTION

Figure 1:
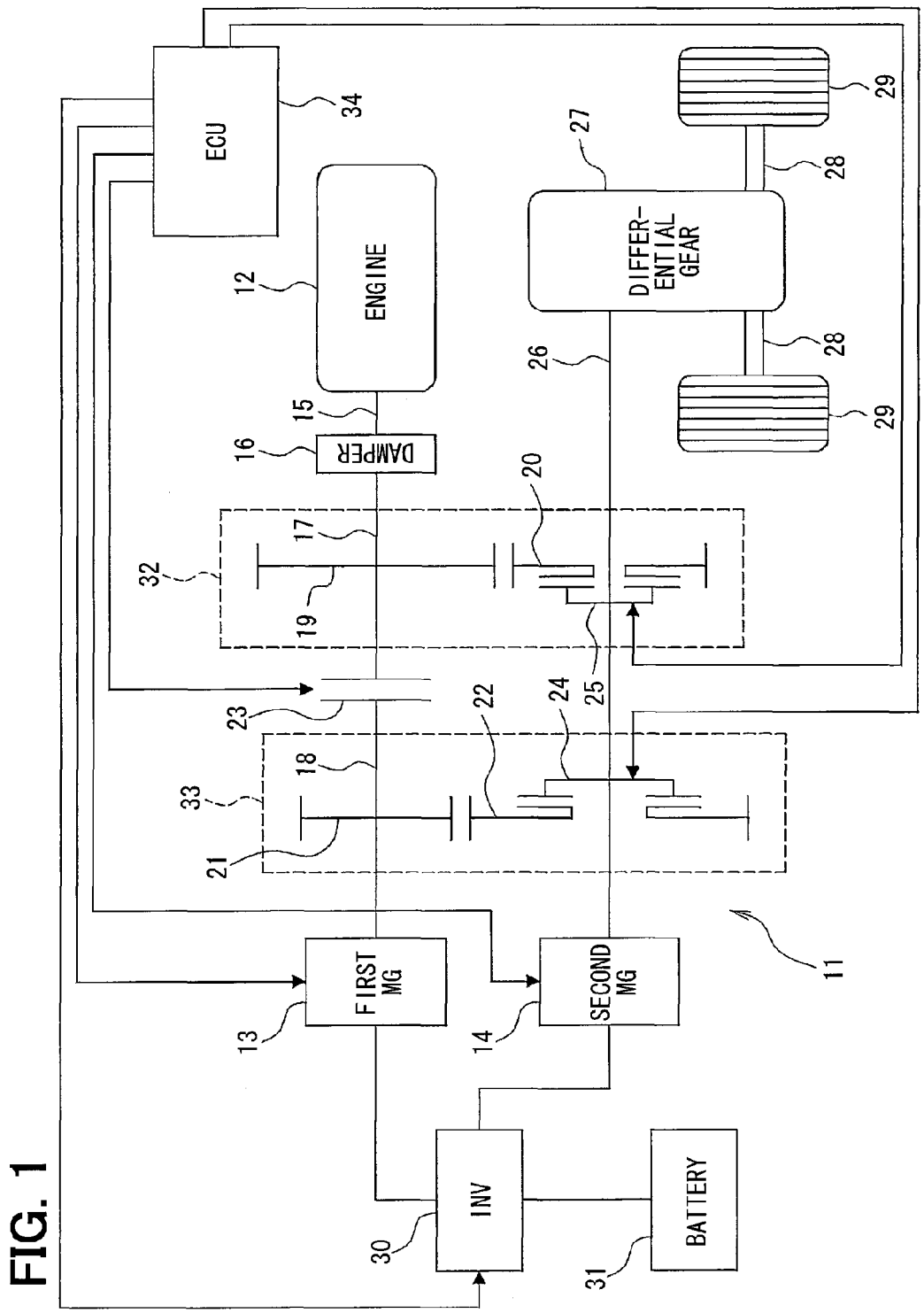
FIG. 1 is a block diagram showing a driving system of a hybrid vehicle according to a first embodiment of the present disclosure.

Embodiments of the present disclosure will be described in accordance with the accompanying drawings.

First Embodiment

A hybrid vehicle driving control system according to a first embodiment of the present disclosure will be described with reference to FIG. 1, FIGS. 2A to 2C and FIG. 3.

A power transmission system 11 mounted on a hybrid vehicle includes an engine 12, a first motor generator (hereafter referred to as "first MG") 13, a second motor generator (hereafter referred to as "second MG") 14, a first engine input shaft 15, a damper 16, a second engine input shaft 17, a motor input shaft 18, an engine-side drive gear 19, an engine-side driven gear 20, a motor-side drive gear 21, a motor-side driven gear 22, a first clutch 23, a second clutch 24, a third clutch 25, an output shaft 26, and a differential gear 27. The power (i.e., driving torque) generated with the engine 12, the first MG 13, and the second MG 14 is transmitted to an axle 28. Accordingly, a driving force to a driving wheel 29 is generated with the transmitted power.

The first MG 13 and the second MG 14 are coupled to a battery 31 (accumulator battery) via an inverter (INV) 30. The first MG 13 and the second MG 14 supply and receive electric power to and from the battery 31 via the inverter 30. The engine 12 is an internal combustion engine. The first MG 13 and the second MG 14 are electric motors to rotate with the electric power from the battery 31. In addition, the first MG 13 and the second MG 14 are generators to generate power by utilizing shaft torque which is transmitted from the power transmission system 11 (more particularly, the motor input shaft 18 in the case of the first MG 13, or the output shaft 26 in the case of the second MG 14) and to charge the battery 31.

The power generated with the engine 12 is input to the first engine input shaft 15 extending from the engine 12. The first engine input shaft 15 functions as a shaft to transmit the power input from the engine 12. The damper 16 as a well-known torsion damper is attached to an end of the first engine input shaft 15 on the side opposite from the engine 12.

The second engine input shaft 17 is attached to the damper 16, on the side opposite from the engine input shaft 15, coaxially with the first engine input shaft 15. Accordingly, the second engine input shaft 17 transmits the power from the first engine input shaft 15 via the damper 16.

The engine-side drive gear 19 is attached on the second engine input shaft 17. The engine-side drive gear 19 rotates along with the second engine input shaft 17.

The power generated with the first MG 13 is input into the motor input shaft 18 extending from the first MG 13. The motor input shaft 18 functions as a shaft to transmit the power input from the first MG 13.

The motor-side drive gear 21 is attached on the motor input shaft 18. The motor-side drive gear 21 rotates along with the motor input shaft 18.

The second engine input shaft 17 and the motor input shaft 18 are provided in parallel and coaxially with each other. Further, the first clutch 23 is provided between the second engine input shaft 17 and the motor input shaft 18 as a clutch mechanism to mutually and coaxially couple and decouple the second engine input shaft 17 and the motor input shaft 18. As the first clutch 23, a wet clutch may be employed, or a dry clutch may be employed.

The power generated with the second MG 14 is input into the output shaft 26 extending from the second MG 14. The output shaft 26 is provided to the sides of the first engine input shaft 15, the second engine input shaft 17 and the motor input shaft 18, in parallel to the input shafts 15, 17 and 18. The output shaft 26 outputs power to be transmitted to the differential gear 27, the axle 28 and the like.

The engine-side driven gear 20 is engaged with the engine-side drive gear 19, and is rotatably supported by the output shaft 26. The third clutch 25 is attached to the output shaft 26, as a clutch mechanism to mutually couple and decouple the output shaft 26 and the engine-side driven gear 20. As the third clutch 25, a wet clutch may be employed, or a dry clutch may be employed. Also a positive clutch such as a synchromesh may be employed.

The motor-side driven gear 22 is engaged with the motor-side drive gear 21, and is rotatably supported by the output shaft 26. Further, the second clutch 24 is attached to the output shaft 26, as a clutch mechanism to mutually couple and decouple the output shaft 26 and the motor-side driven gear 22. As the second clutch 24, a wet clutch may be employed, or a dry clutch may be employed. Also a positive clutch such as a synchromesh may be employed.

The power from the output shaft 26 is transmitted to the driving wheel 29 via a final gear (not shown), the differential gear 27 and the axle 28.

The power transmission is performed between the output shaft 26 and the engine-side driven gear 20 by engaging the third clutch 25. Accordingly, the power transmission is performed between the second engine input shaft 17 and the output shaft 26 via the engine-side drive gear 19, the engine-side driven gear 20 and the third clutch 25 (without the motor input shaft 18). On the other hand, when the third clutch 25 is disengaged, the power transmission is not performed between the second engine input shaft 17 and the output shaft 26 via the engine-side drive gear 19 and the engine-side driven gear 20. The engine-side drive gear 19 and the engine-side driven gear 20 form a high gear mechanism 32 (corresponding to an example of an engine-side gear mechanism). The reduction gear ratio (gear ratio) of the high gear mechanism 32 is lower than the reduction gear ratio (gear ratio) of a low gear mechanism 33 to be described later.

The power transmission is performed between the output shaft 26 and the motor-side driven gear 22 by engaging the second clutch 24. Accordingly, the power transmission is performed between the motor input shaft 18 and the output shaft 26 via the motor-side drive gear 21, the motor-side driven gear 22 and the second clutch 24 (without the engine input shafts 15 and 17). On the other hand, when the second clutch 24 is disengaged, the power transmission is not performed between the motor input shaft 18 and the output shaft 26 via the motor-side drive gear 21 and the motor-side driven gear 22. The motor-side drive gear 21 and the motor-side driven gear 22 form the low gear mechanism 33 (corresponding to an example of a motor-side gear mechanism). The reduction gear ratio (gear ratio) of the low gear mechanism 33 is higher than the reduction gear ratio (gear ratio) of the high gear mechanism 32.

In the power transmission system 11, in the light of the power transmission channel and in the light of arrangement, the gear mechanism closer to the engine 12 is the high gear mechanism 32, and the gear mechanism closer to the first MG 13 is the low gear mechanism 33.

When the first clutch 23 is engaged, the power is transmitted between the second engine input shaft 17 and the motor input shaft 18 via the first clutch 23. When the first clutch 23 is disengaged, the power is not transmitted between the second engine input shaft 17 and the motor input shaft 18.

Furthermore, when the first clutch 23 is engaged, the power transmission is always possible from a position in the second engine input shaft 17 on which the engine-side drive gear 19 is provided to the position in the motor input shaft 18 on which the motor-side drive gear 21 is provided. In other words, no other clutch than the first clutch 23 exists in the power transmission channel from the position in the input shafts 15, 17 and 18 on which the engine-side drive gear 19 is provided to the position where the motor-side drive gear 21 is provided. In this arrangement, it is possible to reduce the number of clutches in comparison with conventional cases, and by extension, it is possible to downsize the power transmission system 11.

It is possible to reduce the distance from the engine 12 to the engine-side drive gear 19 by providing the first clutch 23 and the engine-side drive gear 19 between the motor-side drive gear 21 and the engine 12. As a result, it is possible to maintain high resistance against the torsional vibration of the engine input shafts 15, 17.

Furthermore, it is possible to reduce the distance from the first MG 13 to the motor-side drive gear 21 by providing the first clutch 23 and the motor-side drive gear 21 between the engine-side drive gear 19 and the first MG 13. As a result, it is possible to maintain high resistance against the torsional vibration of the motor input shaft 18.

An electronic control unit (ECU) 34 includes a microcomputer as a main body. The ECU 34 controls the power transmission channel for the power generated with the engine 12 and the first MG 13 and the reduction gear ratio, by controlling driving and non-driving of the first MG 13 and the second MG 14 and engagement and disengagement statuses of the first to third clutches 23 to 25, based on respective physical quantities obtained in the vehicle.

The ECU 34 inputs various signals such as a vehicle speed detected with a vehicle speed sensor (not shown), an accelerator opening (accelerator operation amount) detected with an accelerator sensor (not shown), a state of charge (SOC) of the battery 31 detected with a battery monitor (not shown), and an engine speed detected with a crank angle sensor (not shown).

The ECU 34 controls the engagement and disengagement statuses of the first to third clutches 23 to 25 based on these input signals. More particularly, the ECU 34 controls operation of actuators provided for the respective clutches 23 to 25 (e.g., an actuator to generate hydraulic pressure for engaging and disengaging the clutch) so as to control the engagement and disengagement statuses of the clutches 23 to 25.

By the control of the clutches 23 to 25 with the ECU 34, the power generated with the first MG 13 can be transmitted to the driving wheel 29 via the low gear mechanism 33 and can be transmitted to the driving wheel 29 via the high gear mechanism 32. Furthermore, the power generated with the engine 12 can be transmitted to the driving wheel 29 via the low gear mechanism 33 and can be transmitted to the driving wheel 29 via the high gear mechanism 32.

In the first embodiment, the ECU 34 performs a regeneration control routine in FIG. 3 to be described later. Accordingly, upon deceleration of the vehicle, the regeneration control is performed to drive at least one of the first MG 13 and the second MG 14 with the power of the axle 28 to charge the battery 31 with electric power generated with the MG. At this time, required brake torque is calculated based on the vehicle speed and brake operation amount (e.g., brake pedal depression amount), and a target energy regeneration amount is calculated based on the required brake torque and the state of charge (SOC) of the battery 31. Then, the engagement and disengagement statuses of the first to third clutches 23 to 25 are controlled and a regeneration control mode is selected in accordance with at least one of the target energy regeneration amount, the required brake torque and the vehicle speed. Further, a torque distribution between the first MG 13 and the second MG 14 is calculated based on the target energy regeneration amount and the vehicle speed, and field currents (generation control currents) in the first MG 13 and the second MG 14 are controlled in correspondence with the torque distribution, to control regeneration torques of the first MG 13 and the second MG 14.

Next, the regeneration control mode selection in the present embodiment will be described with reference to FIGS. 2A to 2C. When the target energy regeneration amount is equal to or less than a predetermined threshold value Eth and the required brake torque is equal to or less than a predetermined threshold value Tth, it is determined that it is not necessary to perform the regeneration control with both of the first MG 13 and the second MG 14. Then, as shown in FIG. 2A, a "basic mode" to perform the regeneration control with the second MG 14 is selected by controlling the engagement and disengagement statuses of the first to third clutches 23 to 25 so as not to transmit the power of the axle 28 to the first MG 13. More particularly, the second clutch 24 and the third clutch 25 are disengaged. In the basic mode, the second MG 14 is driven with the power of the output shaft 26 driven with the power of the axle 28, to perform the regeneration control with the second MG 14.

When the vehicle speed is equal to or lower than a predetermined threshold value Vth (at a low speed), as shown in FIG. 2B, a "low-speed time charge assist mode" to perform the regeneration control with the first MG 13 and the second MG 14 is selected by controlling the engagement and disengagement statuses of the first to third clutches 23 to 25 so as to transmit the power of the axle 28 to the first MG 13 via the low gear mechanism 33 (the gear mechanism having a higher gear ratio). More particularly, the first clutch 23 and the third clutch 25 are disengaged and the second clutch 24 is engaged. In the low-speed time charge assist mode, it is possible to perform the regeneration control with the second MG 14 by driving the second MG 14 with the power of the output shaft 26 driven with the power of the axle 28, and it is also possible to perform the regeneration control with the first MG 13 by supplying the power of the output shaft 26 driven with the power of the axle 28 via the low gear mechanism 33 to the first MG 13. Thus it is possible to perform power generation efficiently to perform the regeneration control at a low speed.

When the vehicle speed is higher than the threshold value Vth (at a high speed), as shown in FIG. 2C, a "high-speed time charge assist mode" to perform the regeneration control with the first MG 13 and the second MG 14 is selected by controlling the engagement and disengagement statuses of the first to third clutches 23 to 25 so as to transmit the power of the axle 28 to the first MG 13 via the high gear mechanism 32 (the gear mechanism having a low gear ratio). More particularly, the first clutch 23 and the third clutch 25 are engaged and the second clutch 24 is disengaged. In the high-speed time charge assist mode, it is possible to drive the second MG 14 to perform the regeneration control with the second MG 14 with the power of the output shaft 26 driven with the power of the axle 28, and it is also possible to perform the regeneration control with the first MG 13 by supplying the power of the output shaft 26 driven with the power of the axle 28 to the first MG 13 via the high gear mechanism 32. Thus, it is possible to perform power generation efficiently to perform the regeneration control at a high speed.

The regeneration control routine in FIG. 3 performed with the ECU 34 in the present embodiment will be described.

Figure 3:
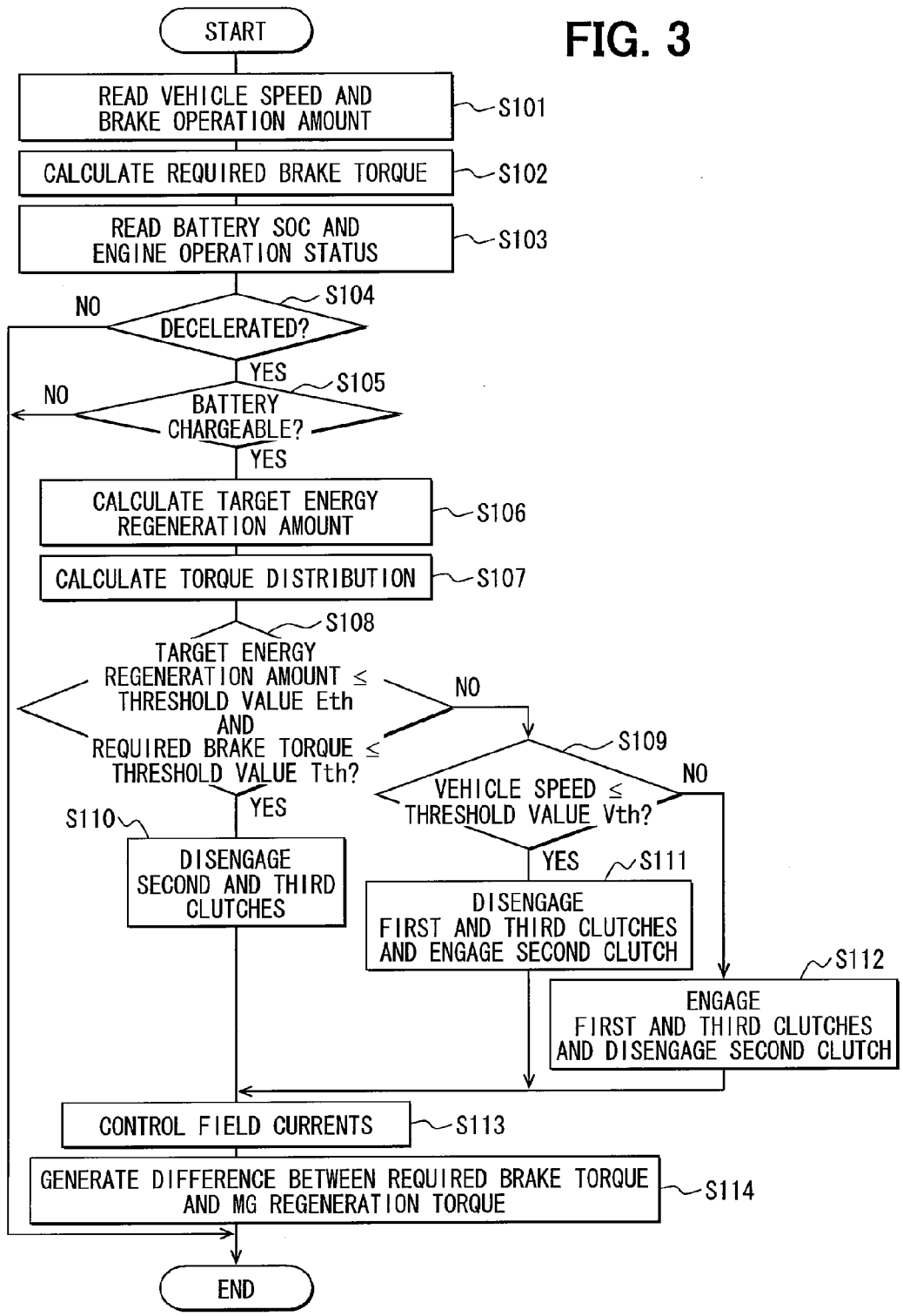
FIG. 3 is a flowchart showing a regeneration control routine.

The regeneration control routine shown in FIG. 3 is repeatedly performed at predetermined periodic intervals during power-on of the ECU 34 so as to play a role of a regeneration control section. When the routine is started, first, at S101, the vehicle speed detected with a vehicle sensor (not shown) and a brake operation amount detected with a brake sensor (not shown) are read. Then the process proceeds to S102, at which required brake torque is calculated using a map, a mathematical expression or the like based on the vehicle speed and the brake operation amount. The map, the mathematical expression or the like for calculation of the required brake torque is previously generated based on design data, test data and the like, and is stored in the ROM of the ECU 34. The process at S102 may be performed by a required brake torque calculation section.

Thereafter, the process proceeds to S103, at which the SOC of the battery 31 and the engine operation status (e.g., the engine rotation speed and load) are read. Then the process proceeds to S104, at which it is determined whether or not the vehicle is decelerated based on e.g. the accelerator opening. When it is determined that the vehicle is decelerated, the process proceeds to S105, at which it is determined whether or not the battery 31 is chargeable based on e.g. whether or not the SOC of the battery 31 is equal to or less than a predetermined value.

When it is determined at S104 that the vehicle is not decelerated, or it is detected at S105 that the battery 31 is not chargeable (it is impossible to charge the battery 31), the present routine ends without execution of processes at S106 and the subsequent steps.

On the other hand, when it is determined at S105 that the battery 31 is chargeable, the process proceeds to S106, at which the target energy regeneration amount is calculated using a map, a mathematical expression or the like based on the required brake torque and the SOC of the battery 31. The map or the mathematical expression for calculation of the target energy regeneration amount is previously generated based on design data, test data or the like, and is stored in the ROM of the ECU 34. The process at S106 may be performed by a target energy regeneration amount calculation section.

Thereafter, the process proceeds to S107, at which torque distribution between the first MG 13 and the second MG 14 is calculated using a map or a mathematical expression based on the target energy regeneration amount and the vehicle speed. The map or the mathematical expression for calculation of the torque distribution is previously generated based on design data, test data or the like, and is stored in the ROM of the ECU 34. The process at S107 may be performed by a torque distribution calculation section.

Thereafter, the process proceeds to S108, at which it is determined whether or not the target energy regeneration amount is equal to or less than a threshold value Eth and the required brake torque is equal to or less than the threshold value Tth.

When it is determined at S108 that the target energy regeneration amount is equal to or less than the threshold value Eth and the required brake torque is equal to or less than the threshold value Tth, the process proceeds to S110, at which the "basic mode" to perform the regeneration control with the second MG 14 is selected by disengaging the second clutch 24 and the third clutch 25 so as not to transmit the power of the axle 28 to the first MG 13. In the "basic mode", it is possible to perform the regeneration control with the second MG 14 by driving the second MG 14 with the power of the output shaft 26 driven with the power of the axle 28.

On the other hand, when it is determined at S108 that the target energy regeneration amount is greater than the threshold value Eth or it is determined that the required brake torque is greater than the threshold value Tth, the process proceeds to S109, at which it is determined whether or not the vehicle speed is equal to or lower than the threshold value Vth.

When it is determined at S109 that the vehicle speed is equal to or lower than the threshold value Vth (at a low speed), the process proceeds to S111, at which the "low-speed time charge assist mode" to perform the regeneration control with the first MG 13 and the second MG 14 is selected by disengaging the first clutch 23 and the third clutch 25 and engaging the second clutch 24, so as to transmit the power of the axle 28 to the first MG 13 via the low gear mechanism 33 (the gear mechanism having a higher gear ratio). In the low-speed time charge assist mode, it is possible to perform the regeneration control with the second MG 14 by driving the second MG 14 with the power of the output shaft 26 driven with the power of the axle 28, and it is also possible to perform the regeneration control with the first MG 13 by supplying the power of the output shaft 26 driven with the power of the axle 28 to the first MG 13 via the low gear mechanism 33. Thus, it is possible to perform efficient power generation to perform the regeneration control at a low speed.

On the other hand, when it is determined at the above S109 that the vehicle speed is higher than the threshold value Vth (at a high speed), the process proceeds to S112, at which the "high-speed time charge assist mode" to perform the regeneration control with the first MG 13 and the second MG 14 is selected by engaging the first clutch 23 and the third clutch 25 and disengaging the second clutch 24, so as to transmit the power of the axle 28 to the first MG 13 via the high gear mechanism 32 (the gear mechanism having a lower gear ratio). In the high-speed time charge assist mode, it is possible to perform the regeneration control with the second MG 14 by driving the second MG 14 with the power of the output shaft 26 driven with the power of the axle 28, and it is also possible to perform the regeneration control with the first MG 13 by supplying the power of the output shaft 26 driven with the power of the axle 28 to the first MG 13 via the high gear mechanism 32. Thus, it is possible to efficiently perform power generation to perform the regeneration control at a high speed.

In this manner, when the regeneration control mode has been selected, the process proceeds to S113, at which the regeneration torques of the first MG 13 and the second MG 14 are controlled by controlling field currents (power generation control currents) in the first MG 13 and the second MG 14 in correspondence with the torque distribution between the first MG 13 and the second MG 14.

Thereafter, the process proceeds to S114, at which a friction brake device (not shown) is controlled to generate the difference between the required brake torque and the MG regeneration torque (the sum of the regeneration torque of the first MG 13 and the regeneration torque of the second MG 14), i.e., a brake torque corresponding to a shortage of the MG regeneration torque with respect to the required brake torque.

In the above-described first embodiment, the regeneration control mode is selected by selecting the engagement and disengagement statuses of the clutches 23 to 25 in correspondence with target energy regeneration amount, required brake torque or vehicle speed. Accordingly, it is possible to perform the regeneration control in an appropriate mode by controlling the rotation speed ratio between the first MG 13 and the second MG 14 in correspondence with target energy regeneration amount, the required brake torque or the vehicle speed. Further, it is possible to reduce the load on the friction brake device with MG regeneration torque (braking direction torque) by the regeneration control. Further, the engagement and disengagement statuses of the first to third clutches 23 to 25 are merely selected, and control to maintain the clutches 23 to 25 in the half-engaged status is not performed. Accordingly, it is possible to reduce energy loss due to slip of the first to third clutches 23 to 25, and it is possible to efficiently perform the regeneration control.

Note that in the above-described first embodiment, the basic mode is selected when the target energy regeneration amount is equal to or less than a threshold value and the required brake torque is equal to or less than a threshold value. However, the present disclosure is not limited to the above described configuration. For example, it may be configured such that the basic mode is selected when the target energy regeneration amount is equal to or less than a threshold value, or the required brake torque is equal to or less than a threshold value.

Second Embodiment

Next, a second embodiment of the present disclosure will be described with reference to FIG. 4. Note that regarding elements substantially identical to those in the above-described first embodiment, explanations will be omitted or simplified, and elements different from those in the above-described first embodiment will be mainly described.

In the second embodiment, upon regeneration control, when quick deceleration is required or when the SOC of the battery 31 is high, the power of the axle 28 is transmitted to the engine 12, to apply brake torque with the engine brake to the axle 28 in addition to the brake torque by the regeneration control. At this time, the engagement and disengagement statuses of the clutches 23 to 25 are controlled in correspondence with required brake torque, to select the regeneration control mode.

Next, a regeneration control mode selection in the second embodiment will be described with reference to FIG. 4.

When the required brake torque is greater than a predetermined first threshold value T1, a "high required brake torque mode" to apply the brake torque with the engine brake to the axle 28 is selected by controlling the engagement and disengagement statuses of the clutches 23 to 25 so as to transmit the power of the axle 28 to the engine 12 via the low gear mechanism 33 (the gear mechanism having a high gear ratio). More particularly, the first clutch 23 and the second clutch 24 are engaged and the third clutch 25 is disengaged. In the high required brake torque mode, it is possible to attain comparatively high brake torque to be applied to the axle 28 with the engine brake by transmitting the power of the output shaft 26 driven with the power of the axle 28 to the engine 12 via the low gear mechanism 33.

When the required brake torque is equal to or less than the first threshold value T1 and is higher than a second threshold value T2 (T1>T2), an "intermediate required brake torque mode" to apply the brake torque with the engine brake to the axle 28 is selected by controlling the engagement and disengagement statuses of the clutches 23 to 25 so as to transmit the power of the axle 28 to the engine 12 via the high gear mechanism 32 (the gear mechanism having a lower gear ratio). More particularly, the first clutch 23 and the third clutch 25 are engaged and the second clutch 24 is disengaged. In the intermediate required brake torque mode, it is possible to attain a comparatively low brake torque to be applied to the axle 28 with the engine brake by transmitting the power of the output shaft 26 driven with the power of the axle 28 to the engine 12 via the high gear mechanism 32.

When the required brake torque is equal to or less than the second threshold value T2, a "low required brake torque mode" to apply the brake torque with the engine brake to the axle 28 is selected by controlling the engagement and disengagement statuses of the clutches 23 to 25 so as to transmit the power of the axle 28 to the engine 12 via the high gear mechanism 32 (the gear mechanism having a lower gear ratio) and so as not to transmit the power of the axle 28 to the first MG 13. More particularly, the first clutch 23 and the second clutch 24 are disengaged and the third clutch 25 is engaged. In the low required brake torque mode, the power of the output shaft 26 driven with the power of the axle 28 is transmitted to the engine 12 via the high gear mechanism 32, the brake torque applied to the axle 28 with the engine brake is reduced to a comparatively low torque, and the regeneration control with the first MG 13 is stopped.

In the above-described second embodiment, upon regeneration control, the brake torque with the engine brake, in addition to the brake torque by the regeneration control, is applied to the axle 28, and further, the brake torque with the engine brake is selected by controlling the engagement and disengagement statuses of the clutches 23 to 25 in correspondence with required brake torque. Accordingly, it is possible to effectively use the engine brake to reduce the load on the friction brake device.

Note that in the present disclosure, various changes may be made within a scope without departing from the subject matter. For example, the present disclosure is applicable to a case where the regeneration control mode selection described in the respective first and second embodiments may be appropriately combined.

What is claimed is:

1. A vehicle driving system control apparatus comprising:
   a power transmission device capable of transmitting a power of an engine and powers of a first motor generator and a second motor generator to an axle of a vehicle, the power transmission device including
      an engine input shaft transmitting the power of the engine,
      a motor input shaft transmitting the power of the first motor generator,
      an output shaft receiving the power of the second motor generator and outputting the power to be transmitted to the axle,
      an engine-side gear mechanism transmitting the power of the engine input shaft to the output shaft without the motor input shaft,
      a motor-side gear mechanism transmitting the power of the motor input shaft to the output shaft without the engine input shaft,
      a first clutch being engaged and disengaged to enable and disable a power transmission between the engine input shaft and the motor input shaft,
      a second clutch being engaged and disengaged to enable and disable a power transmission between the motor-side gear mechanism and the output shaft, and
      a third clutch being engaged and disengaged to enable and disable a power transmission between the engine-side gear mechanism and the output shaft;
   a battery supplying and receiving an electric power to and from the first motor generator and the second motor generator;
   a required brake torque calculation section calculating a required brake torque based on a vehicle speed and a brake operation amount;
   a target energy regeneration amount calculation section calculating a target energy regeneration amount based on the required brake torque and a charge status of the battery; and
   a regeneration control section performing a regeneration control when the vehicle is decelerated,
   wherein, in the regeneration control, the regeneration control section drives at least one of the first motor generator and the second motor generator with a power of the axle so as to charge the battery with the electric power generated with the at least one of the first motor generator and the second motor generator, and
   wherein the regeneration control section selects a mode of the regeneration control by controlling engagement and disengagement statuses of the first to third clutches in correspondence with at least one of the target energy regeneration amount, the required brake torque and the vehicle speed.

2. The vehicle driving system control apparatus according to claim 1, further comprising
   a torque distribution calculation section calculating a torque distribution between the first motor generator and the second motor generator based on the target energy regeneration amount and the vehicle speed, wherein the regeneration control section controls regeneration torques of the first motor generator and the second motor generator by controlling field currents in the first motor generator and the second motor generator in correspondence with the torque distribution.

3. The vehicle driving system control apparatus according to claim 1, wherein, when at least one of the target energy regeneration amount and the required brake torque is equal to or less than a predetermined threshold value, the regeneration control section selects a mode to perform the regeneration control with the second motor generator by controlling the engagement and disengagement statuses of the first to third clutches so as not to transmit the power of the axle to the first motor generator.

4. The vehicle driving system control apparatus according to claim 1, wherein, when the vehicle speed is equal to or lower than a predetermined threshold value, the regeneration control section selects a mode to perform the regeneration control with the first motor generator and the second motor generator by controlling the engagement and disengagement statuses of the first to third clutches so as to transmit the power of the axle to the first motor generator via one of the engine-side gear mechanism and the motor-side gear mechanism having a higher gear ratio.

5. The vehicle driving system control apparatus according to claim 4, wherein, when the vehicle speed is higher than the threshold value, the regeneration control section selects a mode to perform the regeneration control with the first motor generator and the second motor generator by controlling the engagement and disengagement statuses of the first to third clutches so as to transmit the power of the axle to the first motor generator via one of the engine-side gear mechanism and the motor-side gear mechanism having a lower gear ratio.

6. The vehicle driving system control apparatus according to claim 1, wherein, when the required brake torque is greater than a predetermined first threshold value, the regeneration control section applies a brake torque with an engine brake to the axle by controlling the engagement and disengagement statuses of the first to third clutches so as to transmit the power of the axle to the engine via one of the engine-side gear mechanism and the motor-side gear mechanism having a higher gear ratio.

7. The vehicle driving system control apparatus according to claim 6, wherein, when the required brake torque is equal to or less than the first threshold value and is greater than a second threshold value, the regeneration control section applies the brake torque with the engine brake to the axle by controlling the engagement and disengagement statuses of the first to third clutches so as to transmit the power of the axle to the engine via one of the engine-side gear mechanism and the motor-side gear mechanism having a lower gear ratio.

8. The vehicle driving system control apparatus according to claim 7, wherein, when the required brake torque is equal to or less than the second threshold value, the regeneration control section applies the brake torque with the engine brake to the axle by controlling the engagement and disengagement statuses of the first to third clutches to transmit the power of the axle to the engine via one of the engine-side gear mechanism and the motor-side gear mechanism having a lower gear ratio and so as not to transmit the power of the axle to the first motor generator.

* * * * *